(12) United States Patent
Mathieu et al.

(10) Patent No.: US 8,014,910 B2
(45) Date of Patent: Sep. 6, 2011

(54) ASSISTED TAKE-OFF METHOD FOR AIRCRAFT

(75) Inventors: Gerard Mathieu, Pibrac (FR); Franck Delaplace, Toulouse (FR); Xavier Le Tron, Blagnac (FR)

(73) Assignee: Airbus France, Toulouse (FR)

( * ) Notice: Subject to any disclaimer, the term of this patent is extended or adjusted under 35 U.S.C. 154(b) by 978 days.

(21) Appl. No.: 11/913,395

(22) PCT Filed: May 4, 2006

(86) PCT No.: PCT/FR2006/001000
§ 371 (c)(1),
(2), (4) Date: Nov. 1, 2007

(87) PCT Pub. No.: WO2006/120321
PCT Pub. Date: Nov. 16, 2006

(65) Prior Publication Data
US 2008/0188999 A1    Aug. 7, 2008

(30) Foreign Application Priority Data

May 10, 2005 (FR) .................... 05 04662

(51) Int. Cl.
*G05D 1/08* (2006.01)

(52) U.S. Cl. ....... 701/7; 701/6; 701/8; 701/14; 701/124; 244/12.4; 244/17.11; 244/17.13; 244/46; 244/48; 340/973; 340/967; 340/969; 340/945; 340/966; 73/65.06

(58) Field of Classification Search ............... 701/6, 7, 701/8, 14, 124; 244/12.4, 17.13, 17.11, 124, 244/46, 48, 49, 87, 45 A, 75.1, 182, 90 R; 340/58, 183, 91, 99.2, 203, 218, 966, 967, 340/969, 945, 973, 975, 978; 73/65.06
See application file for complete search history.

(56) References Cited

U.S. PATENT DOCUMENTS

| 4,261,533 | A | * | 4/1981 | Roberts et al. | 244/7 R |
| 4,825,375 | A |   | 4/1989 | Nadkarni et al. | |
| 4,937,754 | A | * | 6/1990 | Buisson et al. | 701/124 |
| 4,949,269 | A | * | 8/1990 | Buisson et al. | 701/124 |
| 5,979,835 | A | * | 11/1999 | Najmabadi et al. | 244/182 |
| 6,325,333 | B1 | * | 12/2001 | Najmabadi et al. | 244/181 |
| 7,051,976 | B2 | * | 5/2006 | Boe et al. | 244/75.1 |
| 7,201,347 | B2 | * | 4/2007 | Boe et al. | 244/87 |

(Continued)

FOREIGN PATENT DOCUMENTS

FR    2817535    6/2002

(Continued)

OTHER PUBLICATIONS

International Search Report dated Dec. 18, 2006.

*Primary Examiner* — James P Trammell
*Assistant Examiner* — McDieunel Marc
(74) *Attorney, Agent, or Firm* — Dickinson Wright PLLC (57) ABSTRACT

A reference value is arbitrarily selected from a range of possible aircraft rotation speeds. A position of a trimmable horizontal stabilizer is angled in accordance with a centering of the reference value. A deviation between the reference value and an accelerating speed value of the aircraft is determined. Elevators or the horizontal stabilizer are controlled, prior to rotation, in accordance with the determined deviation.

20 Claims, 7 Drawing Sheets

U.S. PATENT DOCUMENTS

| | | | |
|---|---|---|---|
| 7,281,683 B2 * | 10/2007 | Delaplace et al. | 244/75.1 |
| 7,422,176 B2 * | 9/2008 | Chardon | 244/76 R |
| 7,764,201 B2 * | 7/2010 | Schneider | 341/51 |
| 2002/0099479 A1 | 7/2002 | Chatrenet et al. | |
| 2003/0004621 A1 | 1/2003 | Bousquet | |
| 2006/0060699 A1 * | 3/2006 | Boe et al. | 244/87 |
| 2008/0164375 A1 * | 7/2008 | Garcia Laja et al. | 244/131 |

FOREIGN PATENT DOCUMENTS

FR 2826469 12/2002

* cited by examiner

ASSISTED TAKE-OFF METHOD FOR AIRCRAFT

FIELD OF THE INVENTION

The present invention relates to an assisted take-off method for aircraft making it possible to make the behavior of said aircraft uniform during take-off rotations and to eliminate, or at least to reduce, the influence of variations of certain parameters of the aircraft, such as mass, configuration of leading edge slats and of trailing edge flaps, thrust, speed at the time of rotation, etc.

BACKGROUND OF THE RELATED ART

It is known that, prior to an aircraft take-off, the pilot determines a value VR of the speed of the aircraft, called the rotation speed, at which the take-off rotation must start, at the end of the acceleration phase during which said aircraft runs on the take-off runway whilst accelerating. This rotation speed VR is a calculation of optimization of the take-off of the aircraft taking into account both the characteristics of said aircraft (mass, thrust, configuration of slats and flaps, etc) and the characteristics of the take-off runway (length, altitude, state, temperature, etc). Furthermore, it must be within a range of speed values imposed by regulations.

Moreover, it is known that certain aircraft comprise a horizontal stabilizer with adjustable inclination. Such a trimmable horizontal stabilizer is, in the art, described by one or other of the abbreviations PHR (for Plan Horizontal Réglable) or THS (for Trimmable Horizontal Stabilizer). Just like a fixed horizontal stabilizer, a trimmable horizontal stabilizer is provided with elevators forming the trailing edge of said trimmable horizontal stabilizer.

A trimmable horizontal stabilizer can be deflected in the pitch-up or pitch-down direction and it is used in certain flight phases. For example, during the take-off of the aircraft and prior to rotation, it is usual to deflect said trimmable horizontal stabilizer, by the action of a pilot or of an automatic system, by a deflection angle of predetermined value. The theoretical optimum value of the deflection angle of the trimmable horizontal stabilizer depends on several parameters of the aircraft, such as the longitudinal position of the center of gravity, the total mass on take-off, the configuration of the leading edge slats and of the trailing edge flaps, the thrust, the speed at which the rotation takes place, etc.

The real value of the deflection angle is important because it conditions the behavior of the aircraft during the rotation. If the real value of that deflection angle is too pitch-up, this can be followed by a spontaneous take-off without the intervention of the pilot with a possible touch-down of the tail or, on the contrary, if it is too pitch-down, by a laborious take-off having a negative effect on the aircraft performance.

As a general rule, on take-off, the value of the deflection angle of the trimmable horizontal stabilizer corresponds to a pitch-up moment, which is particularly the case when the center of gravity of the aircraft occupies a forward longitudinal position towards the nose of the aircraft: in fact, in this case, the aircraft is difficult to turn at the moment of the rotation and the trimmable horizontal stabilizer must create a high pitch-up moment. However, when the center of gravity of the aircraft is in a rearward longitudinal position, the aircraft has a tendency to turn very easily and the trimmable horizontal stabilizer must create only a weak pitch moment, which can be pitch-up or even pitch-down.

As recalled above, the theoretical optimum value of the deflection angle, at take-off, of the trimmable horizontal stabilizer depends on numerous parameters. Thus, for an accurate adjustment of the inclination of said trimmable horizontal stabilizer, it is necessary to take account of the totality, or at least of a large number, of these parameters, which results in complicated rules.

SUMMARY OF THE INVENTION

The purpose of the present invention is to overcome these disadvantages.

For this purpose, according to the invention, the assisted take-off method for an aircraft comprising a trimmable horizontal stabilizer onto which are articulated elevators, a method according to which:
  there is predetermined:
    a value VR of the speed of the aircraft, called the rotation speed, at which must begin the take-off rotation at the end of the acceleration phase during which said aircraft is running on the ground whilst accelerating, and
    the regulation range of speed values within which must be said rotation speed VR; and
  a take-off assistance pitch command is applied to said aircraft deflecting said trimmable horizontal stabilizer by an angle of predetermined value, is noteworthy in that:
  prior to said acceleration phase, there is chosen arbitrarily, within said regulation range of speed values, a reference speed VRref, lower than said rotation speed VR, and there is determined, for that reference speed VRref, said predetermined value of the deflection angle of said trimmable horizontal stabilizer at least as a function of the longitudinal position of the center of gravity of said aircraft on take-off; and
  during said acceleration phase:
    the speed VC of said aircraft is measured;
    the variable deviation existing between said measured speed VC and said reference speed VRref is determined continuously; and
    a variable correction of said take-off assistance pitch command is carried out according to said speed deviation.

At the rotation, it is possible either to allow the correction to continue for some time during the take-off of the aircraft, or to fix it at the value it reaches at the moment of rotation for a speed value VC at least approximately equal to the rotation speed VR.

Thus, according to the present invention, prior to the rotation, the deflection angle of the trimmable horizontal stabilizer can be made dependent only on a limited number of parameters from among those mentioned above, comprising at least the longitudinal position of the center of gravity of the aircraft, also called "trimming" which is important and known accurately. In this way a great simplification of the adjustment of the deflection of said trimmable horizontal stabilizer is obtained.

The value of said deflection angle thus obtained is, of course, only a simplified compromise value which could have as a consequence that, from one take-off to another, the behavior of the aircraft at the rotation would be different, since one of more of the parameters not taken into account by this compromise value varies, which would disturb the pilot and could lead to the tail of the aircraft coming into contact with the ground.

However, according to the present invention, this disadvantage is eliminated by the correction applied before the start of the rotation and utilizing the deviation between VC and VRref, which furthermore makes it possible to make the take-off behavior of the aircraft uniform by eliminating or at least reducing the effect of variations of parameters not taken into account. It will be noted in this respect that VRref is independent of the pilot.

The present invention therefore makes it possible to use a simplified compromise value for the deflection angle of said trimmable horizontal stabilizer, whilst avoiding the complications brought about by the taking into account of the numerous parameters involved in the theoretical value of this deflection angle and allowing the behavior of the aircraft during successive take-offs to be made uniform.

The correction of said take-off assistance pitch command can be obtained either by the action of said trimmable horizontal stabilizer, or by said elevators, or partly by said trimmable horizontal stabilizer and partly by said elevators.

Furthermore, said speed deviation existing between said values VC and VRref can be estimated either by their ratio or by their difference.

Since in general and for an equal effect the pitch control of an aircraft at take-off must be increasingly pitch-down and its speed increases, the result of this is that, if the speed VC of the aircraft is greater than the reference speed VRref, the correction of said take-off assistance pitch command must be represented by a pitch-down action and, conversely, if the speed VC of the aircraft is less than said reference speed VRref, the correction of said take-off assistance pitch command must result in an increase in the pitch-up action, said correction being zero when the speed VC is equal to the reference speed VRref.

However, it will be understood easily that it is not pertinent to modify the action of the horizontal stabilizer when the speed VC of the aircraft is very much lower than the reference speed VRref. Moreover, most often, it is useless to carry out such a modification whilst the speed VC is less than VRref or than a speed slightly lower (for example by 10 kts) than VRref.

In order to simplify the implementation of the invention, the minimum speed of the range of rotation speeds in which said real rotation speed has to be in order to comply with regulations is advantageously chosen as the reference speed VRref.

This minimum value, and therefore the reference speed VRref, can then be equal to the produce $K \times VS1g$, in which K is a coefficient greater than 1 depending on the thrust and $VS1g$ is the speed at which said aircraft stalls when it is in horizontal flight with a configuration of the leading edge slats and of the trailing edge flaps similar to that used for take-off.

It will be noted that the lift equation at the stalling speed $VS1g$ is written:

$$M \times g = 0.5 \times \rho \times (VS1g)^2 \times Czmax \times S$$

in which expression M is the mass of the aircraft, g is the acceleration of gravity, $\rho$ is the density of air, Czmax is the maximum lift coefficient and S is the reference area. The result of this equation is that the stalling speed $VS1g$ depends on the mass of the aircraft, the altitude (by the density $\rho$), the configuration of the slats and flaps (by the coefficient Czmax) and on the longitudinal position of the center of gravity of the aircraft (also by the coefficient Czmax).

The coefficient K of the product $K \times VS1g$ depends on the ratio between the thrust of the aircraft at take-off and the weight of said aircraft. It therefore depends on the thrust level commanded at take-off and indirectly on the altitude and the temperature (by the thrust) and on the mass of the aircraft. The mean value of the coefficient K is close to 1.06.

Although, as has been mentioned above, the variable deviation existing between said speeds VC and VRref can be estimated by their ratio, it is especially advantageous for it to be estimated by their difference, of the type VC−VRref, that is to say VC−$K \times VS1g$ taking account of the above feature.

In fact, the difference VC−$K \times VS1g$ gives an indication of the quality of the rotation of the aircraft—fast or laborious—(the pitch-up moment generated by the trimmable horizontal stabilizer and the elevators depends on the square of the speed at the moment of rotation) and therefore allows consequent action.

In the case in which the trimmable horizontal stabilizer is used, said predetermined value of the deflection angle of the latter is modified by a variable correction angle $\Delta iH$, expressed as follows:

$$\Delta iH = K1 \times (VC - K \times VS1g)$$

in which expression K1 is a coefficient dependent on the reference speed VRref, on the longitudinal position of the center of gravity and on the configuration of the trailing edge flaps and of the leading edge slats, the coefficient K1 for example being able to have a mean value of about 0.16 degrees of angle per knot of speed.

Similarly, if the elevators are used, the latter are deflected by an additional variable correction angle $\Delta \delta q$ whose value is expressed as follows $$\Delta \delta q = K2 \times (VC - K \times VS1g)$$

in which expression K2 is a coefficient also dependent on the reference speed VRref, on the longitudinal position of the center of gravity, on the configuration of the trailing edge flaps and on the leading edge slats and on the thrust at take-off.

If, for the aircraft in question, the trimmable horizontal stabilizer is n times more effective than said elevators, with regard to pitch control, then K2 is chosen to be n times greater than K1.

The use of the method according to the present invention is particularly easy, in particular when the elevators are used. In fact, it then suffices to modify, during the rotation phase, the characteristic of the aircraft giving the deflection of the elevators according to the commanded deflection instruction. As will be seen below, numerous modifications of this characteristic are possible in order to implement the invention.

BRIEF DESCRIPTION OF THE DRAWINGS

The figures of the appended drawing will give a good understanding of how the invention can be embodied. In these figures, identical references denote similar items.

DETAILED DESCRIPTION OF THE INVENTION

Figure 1:
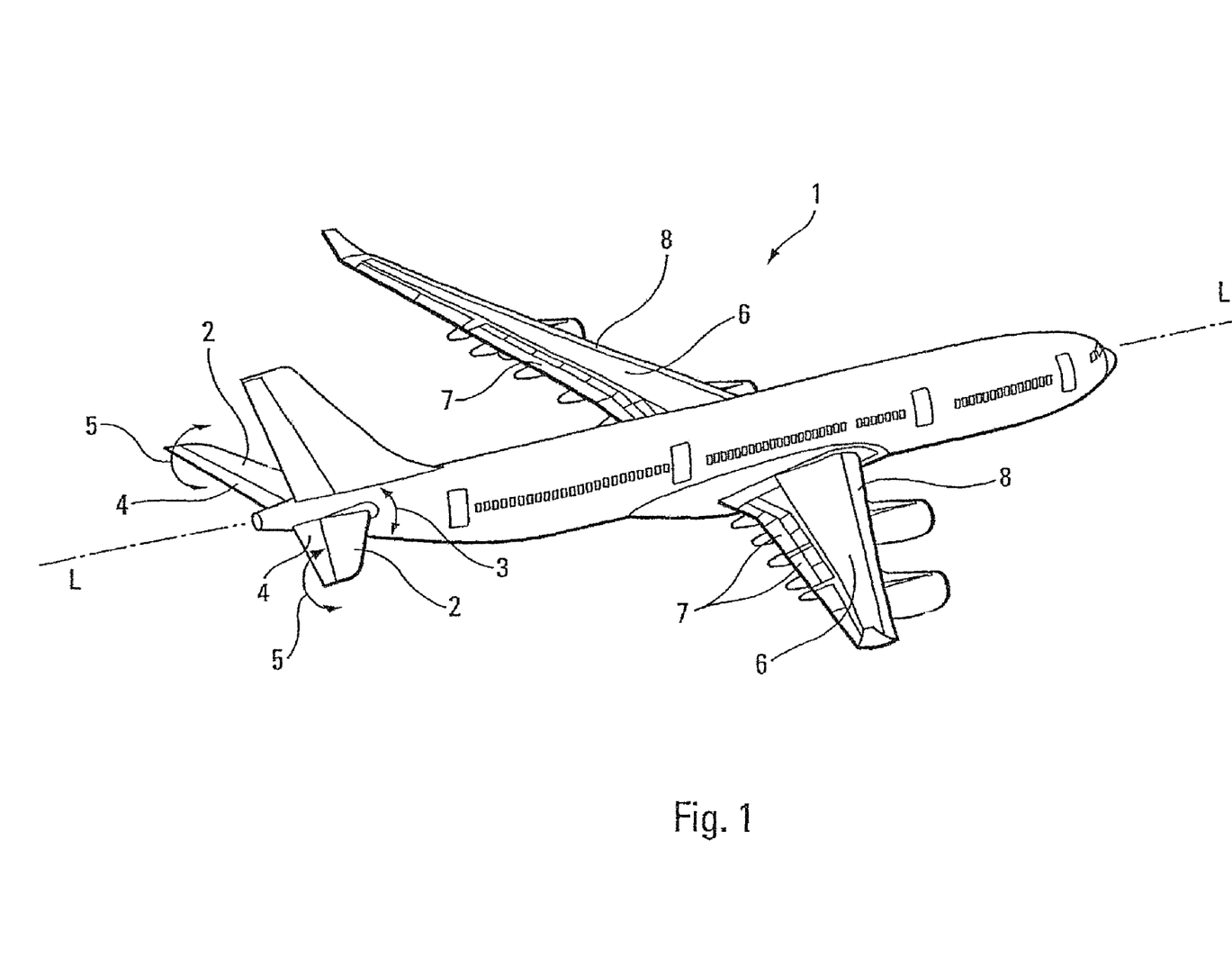
FIG. 1 shows, in diagrammatic perspective, a large capacity civil aircraft provided with a trimmable horizontal stabilizer.

The large capacity aircraft 1, shown diagrammatically in FIG. 1, has a longitudinal axis L-L and comprises a horizontal stabilizer 2 with adjustable inclination, as illustrated by the double-headed arrow 3. At the rear edge of said trimmable horizontal stabilizer 2 are articulated elevators 4 able to rotate with respect to said stabilizer 2, as illustrated by the two-headed arrows 5.

Moreover, on its wings 6, the aircraft 1 comprises trailing edge flaps 7 and leading edge slats 8.

Figure 3A:
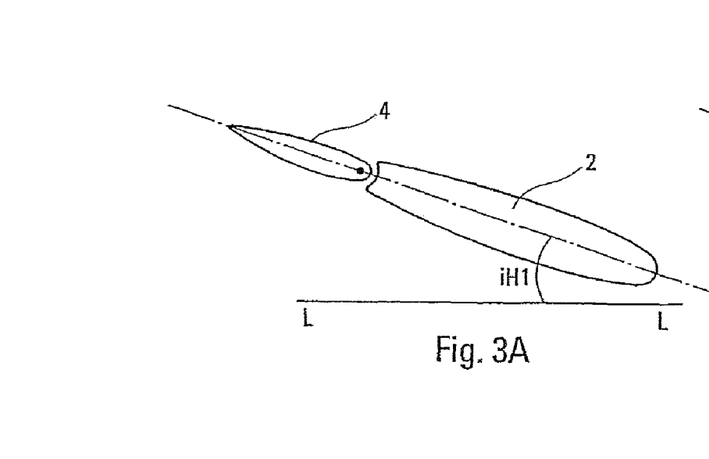
FIGS. 3A and 3B show an example of usual positioning of the trimmable horizontal stabilizer and of the elevators which are attached to it, before and starting from the take-off rotation respectively.

In the prior art, when the aircraft 1, standing on the take-off runway 9, prepares for take-off, there is determined, according to at least certain of the parameters mentioned above, on the one hand, the speed VR at which the take-off rotation must begin and which must be within a range of speed values imposed by regulations and, on the other hand, a value iH1 of the deflection angle iH of the trimmable horizontal stabilizer 2 and the inclination of the latter is adjusted to that value iH1 (generally pitch-up) with respect to said longitudinal axis (see FIG. 3A), in such a way that said trimmable horizontal stabilizer 2 is able, during the take-off, to carry out an appropriate take-off assistance pitch action.

Figure 2:
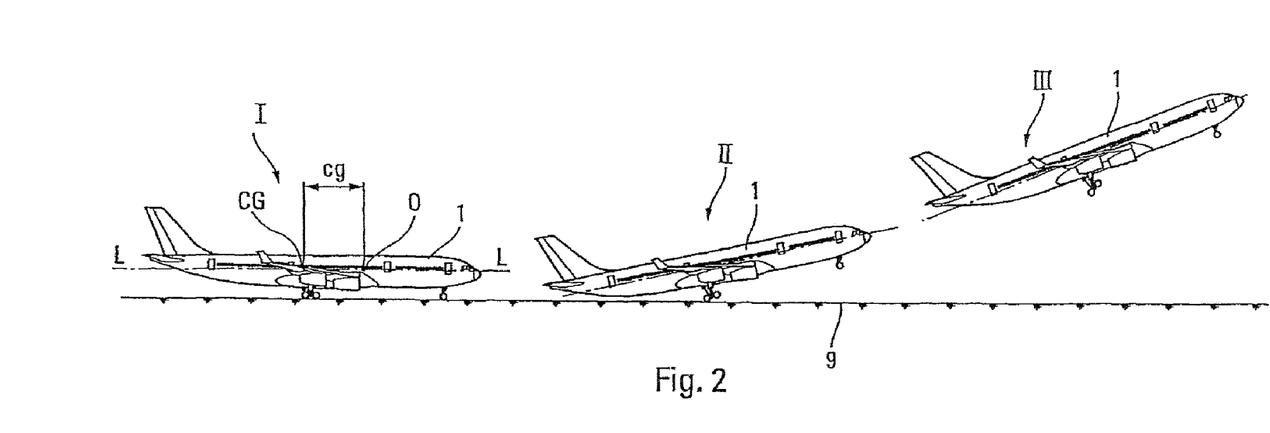
FIG. 2 illustrates the take-off of said aircraft, in three normal successive stages.

In FIG. 2 there has been illustrated the three usual phases I, II and III that the aircraft 1 undergoes during its take-off.

In phase I, the aircraft 1 is running on the take-off runway 9 whilst accelerating in order to reach the predetermined rotation speed VR.

During this acceleration phase I, the trailing edge flaps 7 and the leading edge slats 8 are deployed in the usual manner (not shown), the trimmable horizontal stabilizer 2 is inclined at the angle iH1 and the elevators 4 are, for example, in their position of aerodynamic extension of said trimmable horizontal stabilizer 2. In this usual configuration, shown in FIG. 3A, the assembly of said trimmable horizontal stabilizer 2 and the elevators 4 generates a pitch-up aerodynamic force producing a pitch-up moment for the aircraft 1.

Figure 3B:
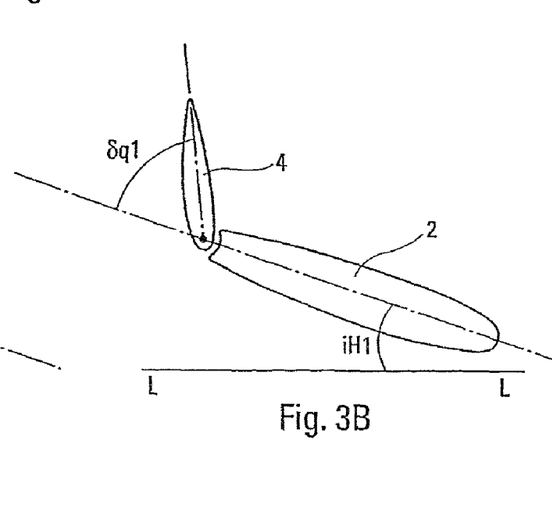

Still in the usual manner, when the speed VC of the aircraft 1 reaches the rotation speed VR (phase II in FIG. 2), the pilot actuates the elevators 4 in order to make them assume a pitch-up position, defined by a value $\delta q1$ of the deflection angle $\delta q$ with respect to the trimmable horizontal stabilizer 2 (see FIG. 3B). The assembly of said trimmable horizontal stabilizer 2 and the elevators 4 then generates a pitch-up aerodynamic force and a pitch-up moment, respectively greater than those generated by the arrangement shown in FIG. 3A and able to cause the take-off of the aircraft 1.

During that take-off, the trimmable horizontal stabilizer 2 is maintained in its inclined position defined by the angle iH1 with the elevators 4 pitch-up deflected by the angle $\delta q1$ (FIG. 3B).

After stabilization of the aircraft 1 on an inclined flight path (phase III of FIG. 2), the inclination of the trimmable horizontal stabilizer 2 is commanded by the flight control laws, the elevators 4 returning into the aerodynamic extension of said stabilizer 2.

If the take-off assistance method according to the present invention is now considered when the aircraft 1 is being prepared for take-off, not only is the rotation speed VR predetermined, but there is also arbitrarily chosen, from within said range of speed values imposed by regulations governing the operation of civil transport aircraft, a reference speed VRref lower than VR and there is determined, for that arbitrary reference speed VRref, the predetermined value iH2 of the deflection angle iH of said trimmable horizontal stabilizer 2 (see FIGS. 4A, 5A, 6A and 7A), as a function of a limited number of parameters comprising at least the longitudinal position of the center of gravity CG along the axis L-L, obtained by calculation of the distance cg of said center of gravity with respect to an origin Q (see FIG. 2). Then, during the acceleration phase II, the speed VC of the aircraft running on the ground whilst accelerating is measured and there is determined the variable deviation existing between the values VC and VRref (either by the ratio VC/VRref, or by the difference VC−VRref) and there is corrected, before the start of rotation, the pitch action applied by the trimmable horizontal stabilizer 2 deflected by the angle iH2, as shown hereafter, with reference to FIGS. 4A to 4C, 5A to 5C, 6A to 6D and 7A to 7D.

In order to simplify the implementation of the invention, the latter provides, in an advantageous embodiment, for the reference rotation speed VRref to be chosen to be equal to the lowest speed of this range of rotation speeds imposed by regulations for the aircraft 1 in the take-off conditions.

In these conditions, the reference rotation speed VRref can be chosen to be equal to the product $K \times VS1g$, in which K is a coefficient greater than 1 depending on the thrust and $VS1g$ is the speed at which said aircraft 1 stalls when it is in horizontal flight with a configuration of leading edge slats 8 and trailing edge flaps 7 similar to that used for take-off.

This coefficient K depends on the ratio between the thrust of the aircraft 1 at take-off and the weight of said aircraft. Its mean value is close to 1.06.

The variable pitch control correction according to the present invention can be applied by action on the trimmable horizontal stabilizer 2, by action on the elevators 4 or by action on the trimmable horizontal stabilizer 2 and on the elevators 4.

Figure 4A:
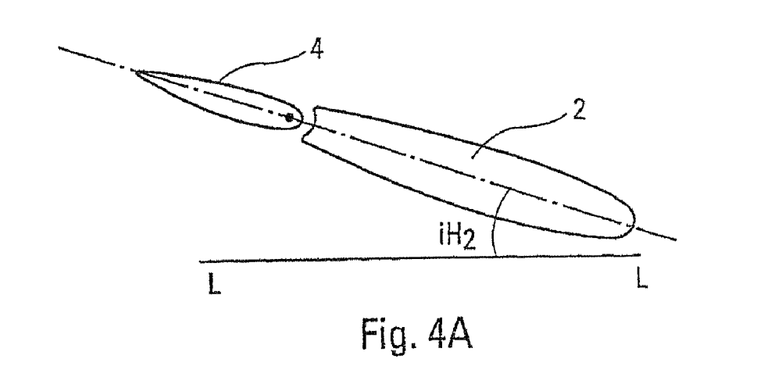
FIGS. 4A to 4C, 5A to 5C, 6A to 6D and 7A to 7D respectively illustrate examples of implementation of the method according to the present invention.
Figure 4B:
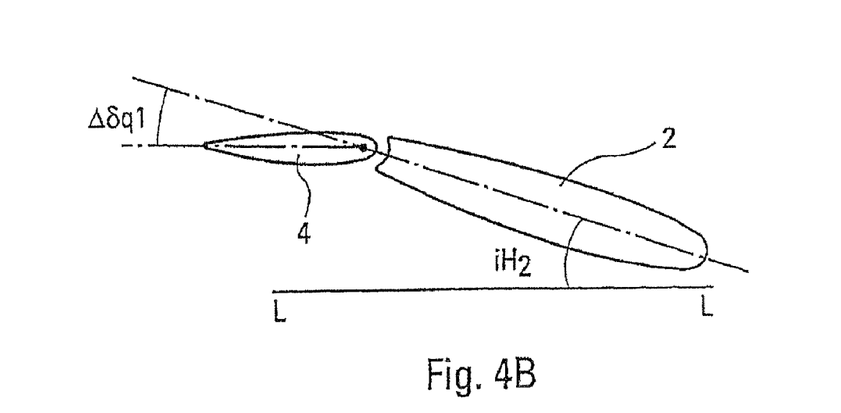
Figure 4C:
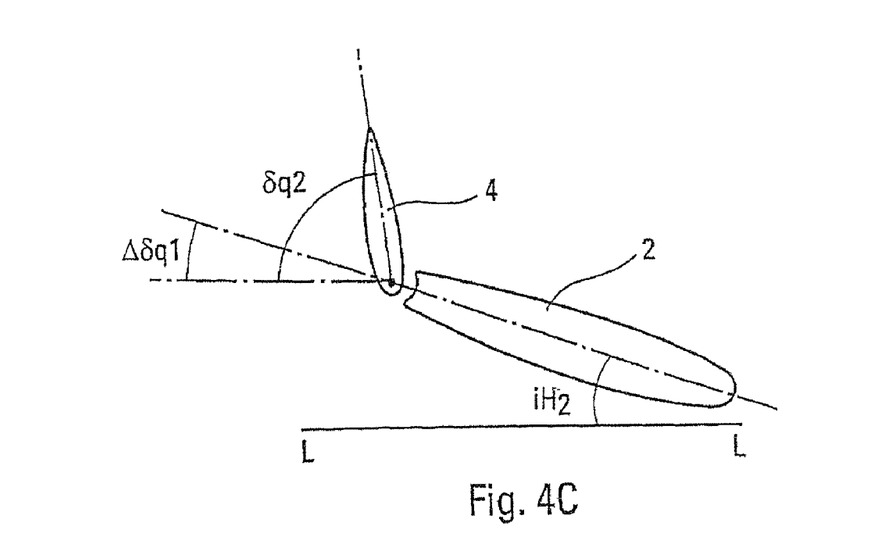

In the example of implementation of the method according to the present invention illustrated by FIGS. 4A, 4B and 4C, the correction is carried out by the elevators 4 alone. In this example, no correction (pitch-up) is applied as long as the speed VC of the aircraft 1 is less than the reference speed VRref or than a speed close to that reference speed (for example VRref−10 kts), the trimmable horizontal stabilizer 2 and the elevators 4 remaining in their original positions shown in FIG. 4A (comparable with FIG. 3A). On the other hand, when the speed VC increases and reaches said reference speed (or said close speed), the elevators 4 are deflected, in the pitch-down direction, by a correction angle $\Delta\delta q1$ (see FIG. 4B) such that:

$$\Delta\delta q1 = K2(VC - K \times VS1g),$$

in which expression K2 is a coefficient dependent on the reference speed VRref, on the longitudinal position cg of the center of gravity CG, on the configuration of the trailing edge flaps 7 and of the leading edge slats 8 and on the thrust at take-off. As soon as the speed VC of the aircraft 1 reaches the rotation speed VR (greater than VRref=$K \times VS1g$), the pilot commands the elevators 4 to pitch-up through an angle $\delta q2$ which is added algebraically to the correction $\Delta\delta q1$, fixed at the value $K2(VR - K \times VS1g)$ (see FIG. 4C).

Figure 5A:
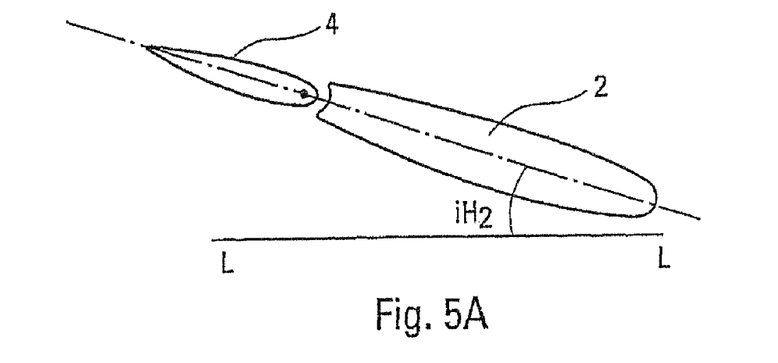
Figure 5B:
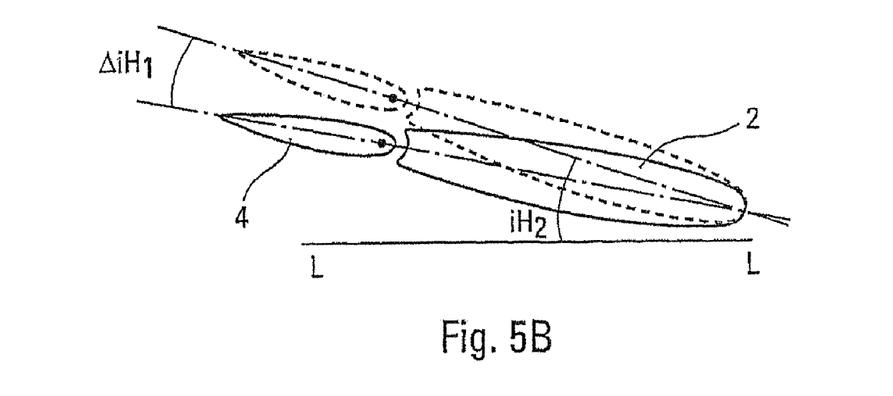
Figure 5C:
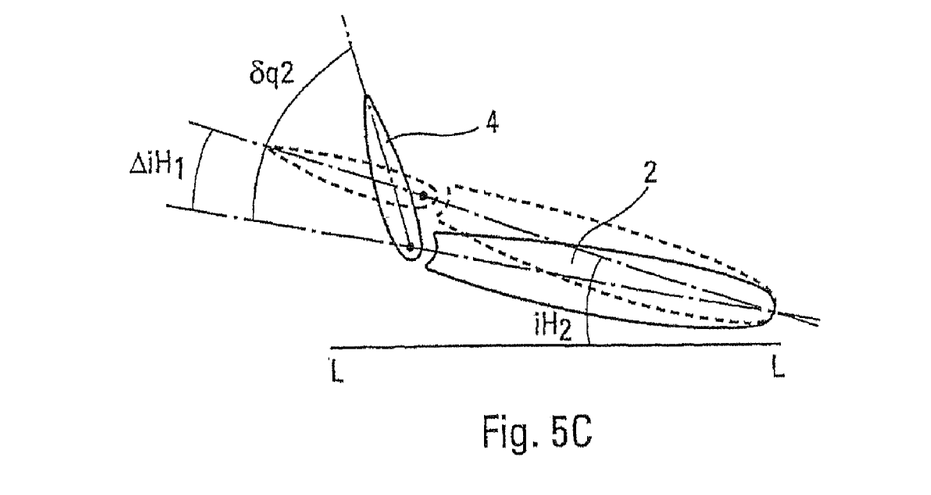

The example shown in FIGS. 5A, 5B and 5C corresponds to that of FIGS. 4A, 4B and 4C, the correction according to the invention now being applied by controlling the trimmable horizontal stabilizer 2. When the speed VC of the aircraft 1 increases and reaches the reference speed VRref or a close speed (VRref−10 kts), the trimmable horizontal stabilizer 2 is deflected (from the situation of FIG. 5A identical to that of FIG. 4A) in the pitch-down direction (see FIG. 5B) through a correction angle $\Delta iH1$, such that $$\Delta iH1 = K1(VC - K \times VS1g)$$

in which expression K1 is a coefficient dependent on the reference speed VRref, on the longitudinal position cg of the center of gravity CG and on the configuration of the trailing edge flaps 7 and of the leading edge slats 8. Its mean value is close to 0.16°/kt. Then, at the moment of rotation (VC=VR), the elevators 4 are, as before, commanded to pitch-up through an angle δq2, whilst the trimmable horizontal stabilizer 2 is inclined at the angle iH2−ΔiH1 (see FIG. 5C), said correction angle ΔiH1 being fixed at the value K1(VR−K×VS1g).

In the examples of FIGS. 4A to 4C, on the one hand, and 5A to 5C, on the other hand, if said trimmable horizontal stabilizer 2 is n times more effective, with regard to the pitch control, than said elevators 4, K2 is equal to n times K1.

Figure 6A:
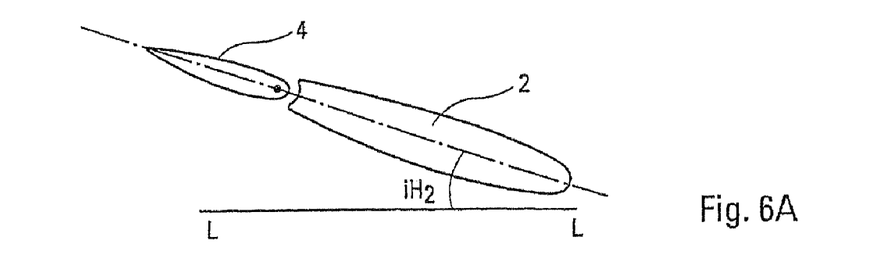
Figure 6B:
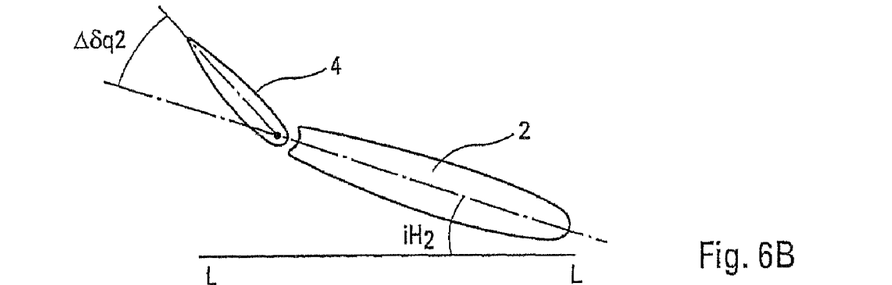
Figure 6C:
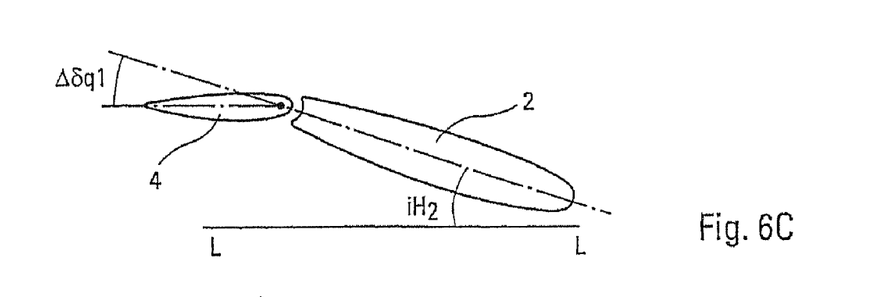
Figure 6D:
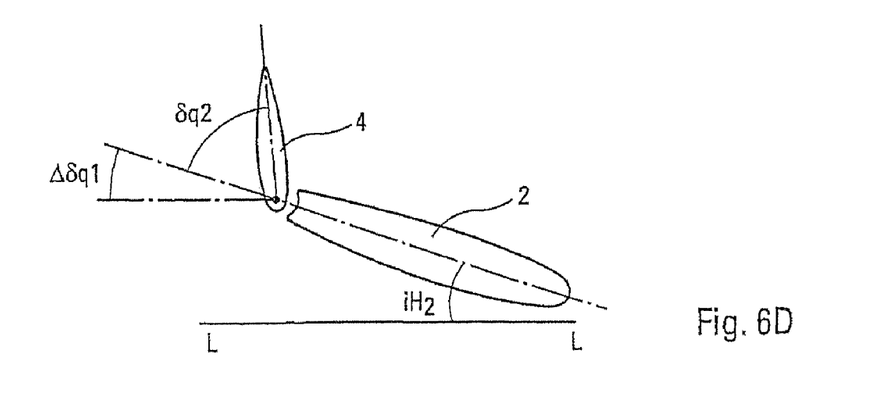

In FIGS. 6A to 6D, there has been shown a variant of the example shown in FIGS. 4A to 4C. In this variant, FIGS. 6A, 6C and 6D are similar to FIGS. 4A, 4B and 4C respectively. The difference between these two examples of implementation of the method according to the invention arises from the fact that, between a threshold speed SV lower than VRref (for example equal to 80 kts) and VRref, a pitch-up correction is applied (see FIG. 6B) by deflecting the elevators 4 through a correction angle Δδq2=K2(VC−K×VS1g). Thus, if the pilot decides to carry out the rotation when the speed VC is lower than VRref, the rear aerodynamic surfaces 2,4 are in an adequate position to assist the rotation. If VC becomes greater than VRref, then a pitch-down moment is applied as illustrated in FIG. 6C, before carrying out the rotation at the speed VR (FIG. 6D).

Figure 7A:
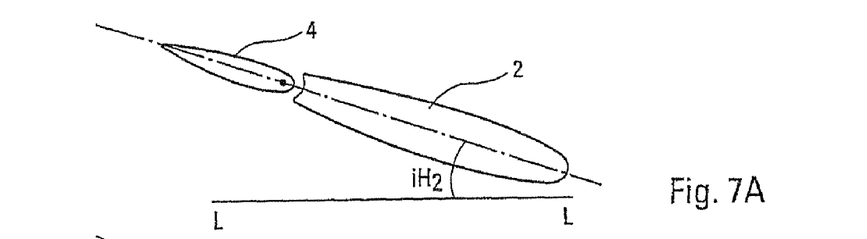
Figure 7B:
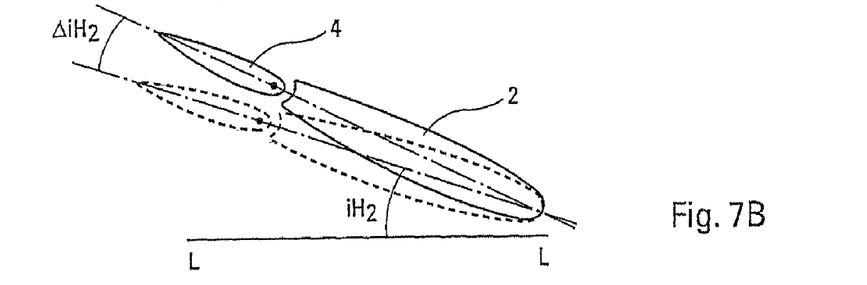
Figure 7C:
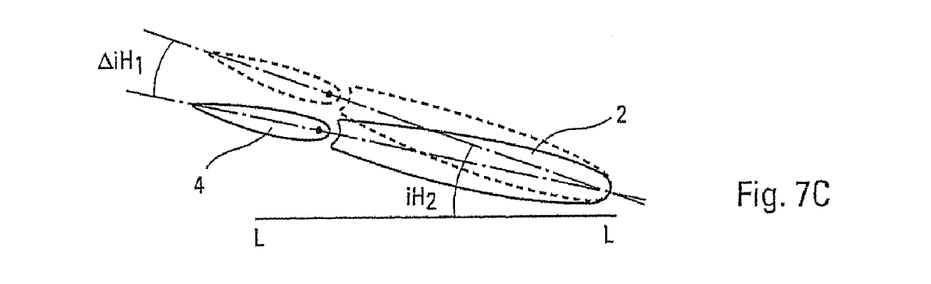
Figure 7D:
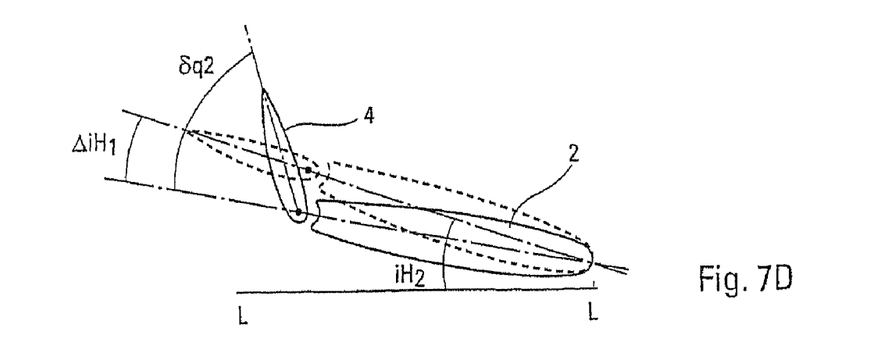

Similarly, in FIGS. 7A to 7D, there has been shown a variant of the example shown in FIGS. 5A to 5C, the FIGS. 7A, 7C and 7D being similar to the FIGS. 5A, 5B and 5C respectively. The difference between the two examples is in that, between the speed threshold SV (lower than VRref) and VRref, a pitch-up correction is applied (see FIG. 7B) by deflecting the trimmable horizontal stabilizer 2 through a correction angle ΔiH2 equal to K1 (VC−K×VS1g), for the same purpose as described with reference to Δδq2 in FIG. 6B. If VC becomes greater than VRref, then a pitch-down moment is applied as shown in FIG. 7C, before carrying out the rotation at the speed VR (FIG. 7D).

It will be easily understood from the above that the pitch correction according to the present invention can be implemented by combination of the actions of the trimmable horizontal stabilizer 2 and of the elevators 4.

The variants of the method according to the present invention using the elevators 4 (FIGS. 4A to 4C and FIGS. 6A to 6D) are particularly easy to implement on the aircraft 1.

Figure 8:
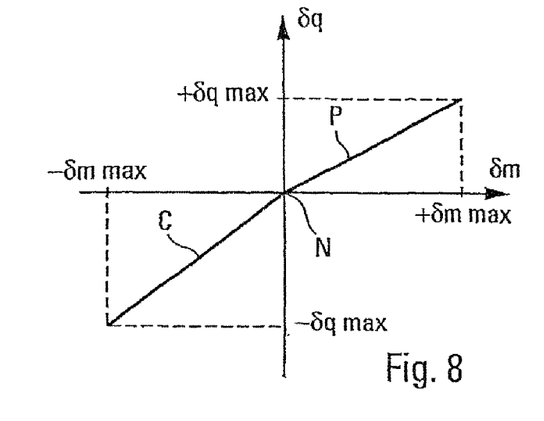
FIG. 8 shows an example of a known usual diagram, illustrating the variation of the deflection angle of the elevators of an aircraft as a function of the commanded deflection instruction.

It is in fact known that, as illustrated in FIG. 8, the characteristic of the aircraft 1 giving, in a system of rectangular axes, the deflection angle δq of the elevators 4 according to the deflection instruction δm at the control column comprises a pitch-down part P, generally linear, and a pitch-up part C, also generally linear, said pitch-down and pitch-up parts P and C being connected to each other at a neutral point N for which δq=0 and δm=0. Thus, for a variation of the pitch-down deflection instruction δm between 0 and a maximum value +δmmax (and conversely between δmmax and 0), the pitch-down deflection of the elevators 4 varies between 0 and a maximum value +δqmax (and conversely between +δqmax and 0). Similarly, for a variation of the pitch-up deflection instruction δm between 0 and a maximum value −δmmax (and conversely between −δmmax and 0), the pitch-up deflection of the elevators 4 varies between 0 and a maximum value −δqmax (and conversely between −δqmax and 0).

Figure 9:
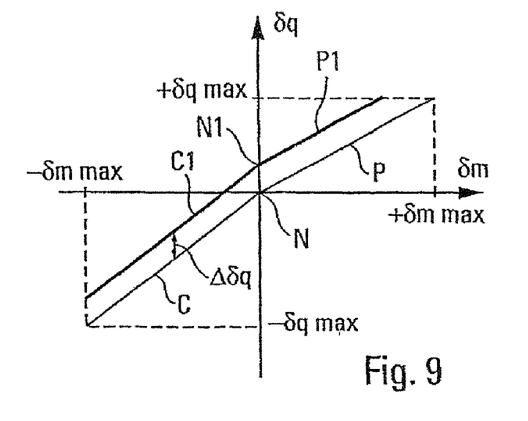
FIGS. 9 and 10 show variants of the diagram shown in FIG. 8 in order to implement the two examples of the method of the invention, illustrated by FIGS. 4A to 4C and 6A to 6D respectively.

In the example of implementation of the invention illustrated by FIG. 9, the known characteristic C, P is modified, as shown in FIG. 8, by adding to it the correction angle Δδq (representing Δδq1 in FIGS. 4B, 4C, 6C and 6D and Δδq2 of FIG. 6D) on both the pitch-down part P and on the pitch-up part C. In this way a modified characteristic C1, P1 is obtained, due to the present invention and resulting from an amplitude translation of Δδq in the direction of +δqmax, parallel with the δq axis. The neutral point N also undergoes such a translation, such that the resulting point N1 is no longer neutral since, for the horizontal coordinate δm=0, its vertical coordinate is equal to Δδq.

Figure 10:
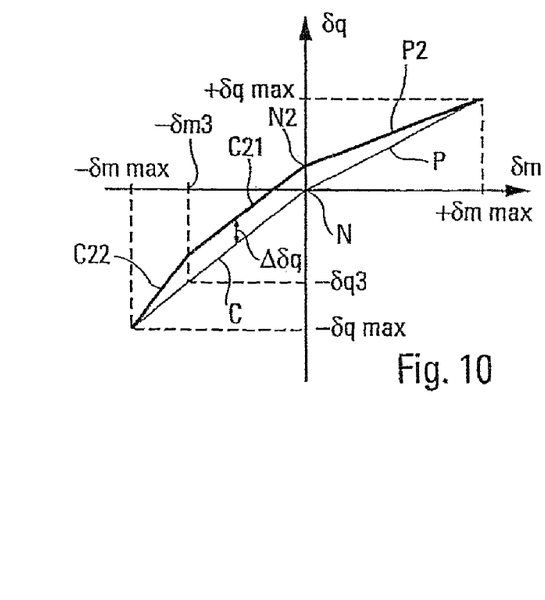

In the second example of implementation illustrated by FIG. 10, the point of the pitch-up part C is introduced, defined by the coordinates −δm3 and −δq3 and corresponding to the deflection angle δq2 used for the rotation. For example, −δm3 and −δq3 are equal to two thirds of −δmmax and −δqmax respectively. In this example, the modified pitch-up part comprises, between −δm3 and 0, a first portion C21 having undergone, like the pitch-up part C1 of FIG. 9, a translation of amplitude Δδq in the direction of +δqmax, parallel with the axis δq, and a second inclined portion C22, joining the point −δm3, −δq3+Δδq to the point −δmmax, −δqmax. In this second example, the neutral point N is displaced to N2 (similar to N1) and the pitch-down part P2 of the modified characteristic is inclined and joins the point N2 to the point +δmmax, +δqmax.

The two examples of modified characteristics given by FIGS. 9 and 10 are of course not limitative, it being possible to envisage numerous other modifications of the characteristic C, P.

In the usual case where the aircraft 1 comprises a computer (not shown) in which a take-off law is stored, it is advantageous that the method according to the present invention be integrated with said law.

Whatever the implementation of the method according to the present invention may be, it is possible, at the rotation, either to prolong the correction for some time, or to fix it at the value that it reaches for a value of the speed VC at least approximately equal to the rotation speed VR.

The invention claimed is:

1. An assisted take-off method for an aircraft comprising a trimmable horizontal stabilizer onto which are articulated elevators, the method comprising:
  predetermining:
    a value VR of the speed of the aircraft, called the rotation speed, at which must begin the take-off rotation at the end of the acceleration phase during which said aircraft is running on the ground whilst accelerating, and
    a regulation range of speed values within which must be said rotation speed VR; and
  applying a take-off assistance pitch command to said aircraft deflecting said trimmable horizontal stabilizer by an angle of predetermined value, wherein:
  selecting arbitrarily, prior to said acceleration phase, within said regulation range of speed values, a reference speed VRref, lower than said rotation speed VR, and determining, for that reference speed VRef, said predetermined value of a deflection angle of said trimmable horizontal stabilizer at least as a function of the longitudinal position of a center of gravity of said aircraft on take-off; and
  during said acceleration phase:
    measuring the speed VC of said aircraft;
    determining continuously the variable deviation existing between said measured speed VC and said reference speed Vrref; and
    carrying out a variable correction of said take-off assistance pitch command according to said speed deviation.

2. The method as claimed in claim 1, wherein, starting from the rotation, said correction is allowed to continue during the take-off of the aircraft.

3. The method as claimed in claim 1, wherein at a the moment of the rotation, the correction is fixed at the value it reaches for a speed value VC at least approximately equal to the rotation speed. VR.

4. The method as claimed in claim 1, wherein the correction of said take-off assistance pitch command is obtained by an intermediary of said trimmable horizontal stabilizer.

5. The method as claimed in claim 4, wherein the predetermined value of the deflection angle of said trimmable horizontal stabilizer is modified by a correction value expressed as follows:

$$\Delta iH = K1 \times (VC - K \times VS1g)$$

in which expression K1 is a coefficient dependent on the reference speed VRref, on the longitudinal position of the center of gravity and on the configuration of trailing edge flaps and of leading edge slats.

6. The method as claimed in claim 5, wherein the mean value of K1 is about 0.16°/kt.

7. The method as claimed in claim 5, applied to an aircraft in which said trimmable horizontal stabilizer is n times more effective than said elevators, with regard to pitch control, wherein $K2 = n \times K1$.

8. The method as claimed in claim 1, wherein the correction of said take-off assistance pitch command is obtained by an intermediary of said elevators.

9. The method as claimed in claim 8, wherein said elevators are deflected by a correction angle $\Delta \delta q$ whose value is expressed as follows:

$$\Delta \delta q = K2 \times (VC - K \times VS1g)$$

in which expression K2 is a coefficient dependent on the reference speed VRref, on the longitudinal position of the center of gravity, on the configuration of trailing edge flaps and on leading edge slats and on the thrust at take-off.

10. The method as claimed in claim 9, wherein a characteristic associated with the aircraft and giving the deflection of the elevators as a function of a deflection instruction of said elevators comprises a pitch-down part and a pitch-up part connected to each other at a neutral point, wherein said characteristic is modified by adding said correction angle $\Delta \delta q$ to it.

11. The method as claimed in claim 1, wherein the correction of said take-off assistance pitch command is obtained partly by an intermediary of said trimmable horizontal stabilizer and partly by an intermediary of said elevators.

12. The method as claimed in claim 1, wherein said speed deviation existing between said values VC and VRref is estimated by a ratio between them.

13. The method as claimed in claim 1, wherein said speed deviation existing between said values VC and VRref is estimated by the difference between them.

14. The method as claimed in claim 1, wherein, when the speed VC of the aircraft is greater than the reference speed VRref, the correction of said take-off assistance pitch command corresponds to a pitch-down action.

15. The method as claimed in claim 1, wherein, when the speed VC of the aircraft is less than the reference speed VRref, the correction of said take-off assistance pitch command corresponds to a pitch-up action.

16. The method as claimed in claim 1, wherein no correction of said take-off assistance pitch command is carried out as long as said speed VC of the aircraft is not at least approximately equal to said reference speed VRref.

17. The method as claimed in claim 1, wherein said reference speed VRref is chosen to be equal to the minimum speed value of said range.

18. The method as claimed in claim 17, applied to an aircraft comprising trailing edge flaps and leading edge slats, wherein said reference speed VRref is equal to the product $K \times VS1g$, in which K is a coefficient greater than 1 and VS1g is the speed at which said aircraft stalls when it is in horizontal flight with a configuration of the leading edge slats and of the trailing edge flaps similar to that used for take-off.

19. The method as claimed in claim 18, wherein the coefficient K depends on the ratio between the thrust of the aircraft at take-off and the weight of said aircraft.

20. The method as claimed in claim 19, wherein the coefficient K has a mean value close to 1.06.

* * * * *